United States Patent [19]
Parker

[11] 3,800,464
[45] Apr. 2, 1974

[54] FISH TRAP
[76] Inventor: Gordon J. Parker, P.O. Box 131, Marine, Minn. 55147
[22] Filed: July 13, 1972
[21] Appl. No.: 271,273

[52] U.S. Cl.................................. 43/100, 43/55
[51] Int. Cl............................................ A01k 69/06
[58] Field of Search......... 43/100, 103, 55, 56, 101, 43/105

[56] References Cited
UNITED STATES PATENTS
| | | | |
|---|---|---|---|
| 3,099,890 | 8/1963 | Madere | 43/100 |
| 3,605,320 | 9/1971 | Wells | 43/100 X |
| 3,691,667 | 9/1972 | Illinger | 43/100 X |
| 3,271,894 | 9/1966 | Manno et al | 43/100 X |
| 3,559,329 | 2/1971 | Chiu | 43/55 |
| 2,551,236 | 5/1951 | Bergman | 43/100 |
| 1,447,502 | 3/1923 | Asanio et al | 43/100 |

Primary Examiner—James H. Czerwonky

[57] ABSTRACT

A fish trap constructed from plastic mesh combined with a wire frame. A removable entrance cone may be constructed from wire mesh bent about a support frame or plastic mesh molded into a frame engaging plastic lip. The entrance cone is pivotally mounted on the frame, and is held in place by spring loaded hooks connected to the frame.

5 Claims, 8 Drawing Figures

FISH TRAP

BACKGROUND OF THE INVENTION

In the prior art, conical entrance fish traps are known. These prior art traps are generally constructed from metal wire screen or mesh bent about a steel rod frame. Because of this form of construction they tend to be very heavy to handle and highly prone to rusting due to their continuous use in a water environment. They also usually have small door openings either at one end or in the middle. A small door opening prevents rapid and injury free removal of the fish from the traps. Many scales are rubbed off of the fish making them susceptible to a variety of fish diseases. In cold winter weather, slow removal of fish from trap causes them to be frozen to the screen. Also the cold air temperature freezes the fishes slime coating which inflicts fatal harm to the fish. The wire screen or mesh causes difficulties in other respects as well. The edges of the screen pose hazards with sharp bits of wire pointing in various directions. These sharp ragged edges are not only dangerous to the person handling the fish trap but tend to damage any captured fish thus decreasing their marketability and causing a loss of a substantial portion of the fisherman's income.

SUMMARY OF THE INVENTION

Briefly, my invention overcomes the above mentioned difficulties by utilizing a preformed plastic mesh secured to ring shaped supporting rods by being woven thereabout. The plastic mesh supporting rods are in turn carried by a surrounding wire frame so as to provide a lightweight, non-rusting, inexpensive fish trap. The plastic mesh has softer blunted edges so there is no danger to the fisherman and no damage to the fish. Since the plastic is smoother it tends to snag less on obstructions, and the lightweight construction permits the trap to be inverted and emptied much more easily. The removable end cone also facilitates in emptying the fish trap easily. This removable end cone may be constructed from plastic molded directly into a frame engaging circumferential support member which will be described in detail later. One other important feature of my fish trap is the usefull combination use as a live box for either minnows or game fish, when the opposite end to the removable end cone is made of a flat piece of screen instead of another cone. The lightness of the combination trap and live box, facilitates easy removal from the water. Since the whole end cone is removable the trap may be emptied completely and quickly by merely tiping it upside down. It may therefore be seen that it is an object of my invention to provide a fish trap which is lighter, longer lasting, less expensive, safer, and less damaging to the fish. Further objects and advantages will become apparent upon consideration of the following detailed description and drawings.

DETAILED DESCRIPTION OF THE DRAWINGS

DESCRIPTION OF THE PREFERRED EMBODIMENT

Figure 1:
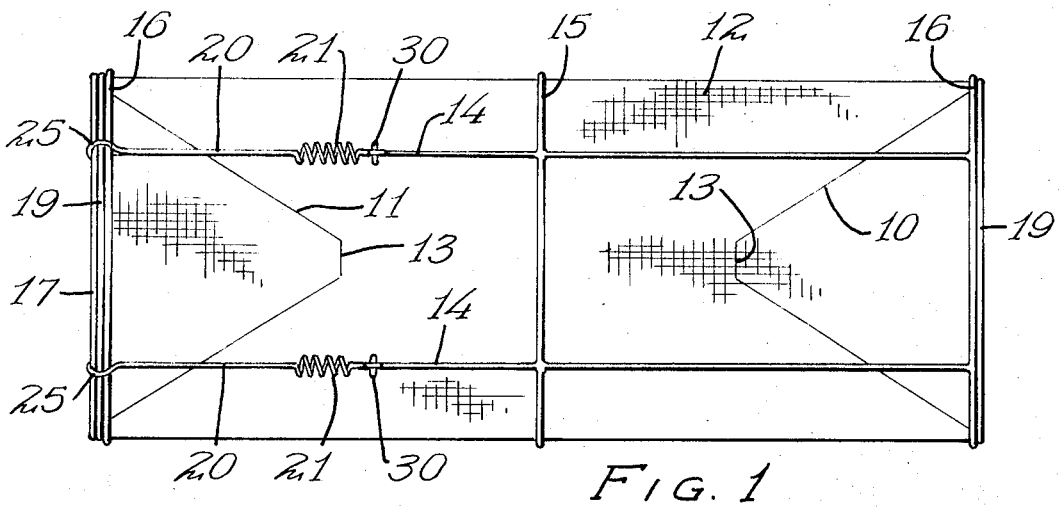
FIG. 1 and 2 show two opposite side views of the fish trap of my invention.
Figure 2:
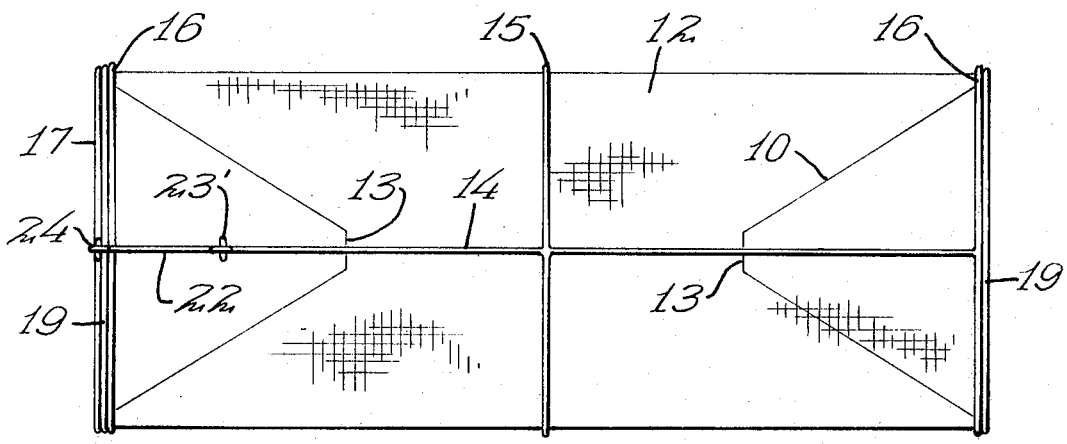
Figure 3:
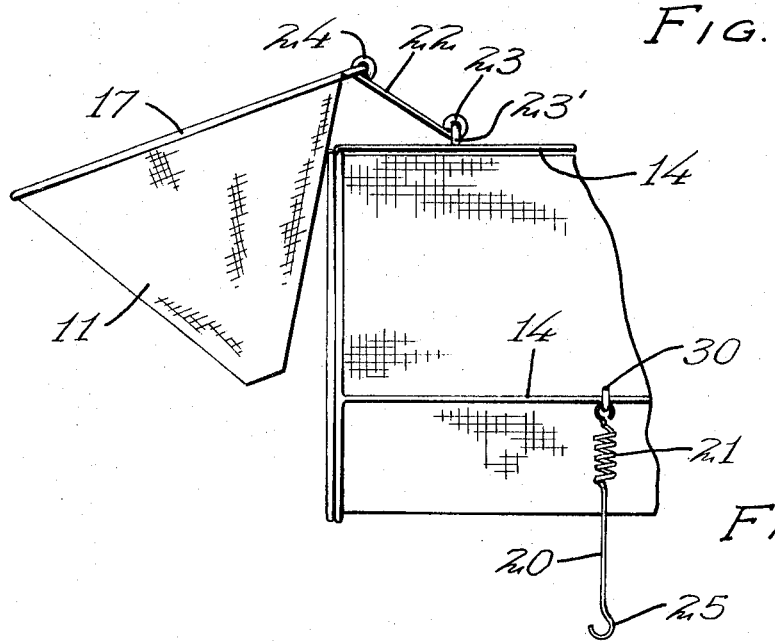
FIG. 3 is an enlarged cut away view of the fish trap showing how the conical entrance section is removable to facilitate emptying the fish trap.

Referring simultaneously to FIGS. 1 and 2 two opposite sides of the fish trap of my invention are shown. A main frame is formed from a central ring shaped rod 15 and two end ring shaped rods 16. These rings are longitudinally connected by three rods 14 spaced generally equidistant about the circumferance of the cylindrical structure. A mesh material 12 is formed into a cylindrical structure and fastened at each end on two supporting rings 19. Supporting rings 19 are in turn connected to main frame rings 16 as will be described in detail later. Conical shaped members 10 and 11 are provided at opposite ends. The conical members are formed either of plastic mesh or metal wire screen which is securely fastened at its open end to a circular ring or support. In FIGS. 1 and 2 cone shaped member 10 is permanently positioned and secured directly to ring 16. Cone 11, however, is removable and is therefore connected to a reinforcing ring 17 separate from rings 16 and 19. The removable ring 17 and cone 11 are shown in a partially removed position in FIG. 3. Simultaneous reference to FIGS. 1, 2 and 3 will show that cone 11 may pivot out on a hook 24 at the end of a connecting rod 22 and a pivoting ring 23. Pivoting ring 23 engages a small eyelet or ring 23' which is soldered or otherwise suitably connected to a longitudinal rod 14. When the cone is in position in the fish trap it and reinforcing ring 17 are secured by means of a pair of hooks 25 connected by means of rods 20 to a pair of springs 21 which are anchored to small anchoring rings 30 soldered or otherwise fastened to rods 14. Both cones 10 and 11 are provided with small openings 13 in the ends so that, when the entire structure is immersed in the water, fish are channeled down by the cone shaped member and caused to swim into the trap. The opening 13 is of course quite small so that the fish are unlikely to find their way back out. When the trap is full the fish are easily emptied from the trap by merely removing cone 11 as shown in FIG. 3 and dumping the trap out. This operation is made much easier by the lightweight characteristics of the trap which derive from the use of plastic mesh rather than heavy wire mesh. This plastic mesh is also much easier on the fish causing less damage and is less hazarderous to the fisherman since there are no sharp wire edges protruding upon which the fisherman could be injured.

Figure 4:
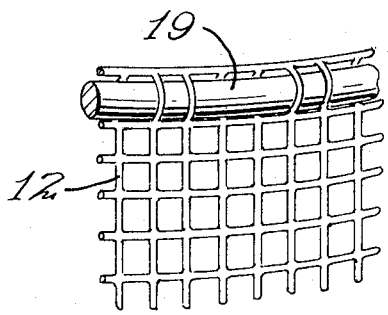
FIG. 4 is a detail view showing how the plastic mesh is woven onto a supporting frame member.

In FIG. 4 a detail drawing is provided to show how the plastic mesh is secured to the frame work of the trap shown in FIGS. 1, 2 and 3. In FIG. 4 it may be seen that the plastic mesh 12 is woven onto support ring 19. In the embodiment shown alternate pairs of vertical strands are positioned on opposite sides of the support ring 19. It is evident however, that other arrangements could be used such as every other strand or each subsequent group of three strands or any combination thereof.

Figure 5:
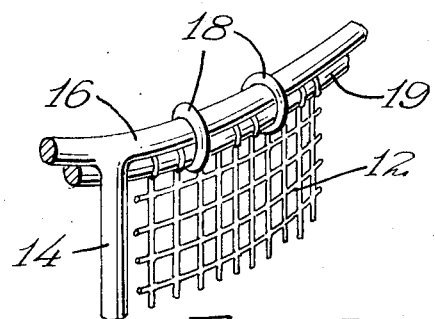
FIG. 5 shows how the supporting frame member with the plastic mesh woven thereon is further supported on the main frame.

In FIG. 5 it may be seen that support ring 19 with the plastic mesh 12 woven thereof is supported to the main end rings 16 by means of small rings or loops 18 which are commonly referred to in the art as hog rings. Hog rings 18 encircle support ring 19 and end ring 16. If desired, plastic mesh 12 may be incorporated only on the sides of the trap with the cones 10 and 11 being constructed from conventional metal wire mesh. However, the cones may also be constructed from plastic mesh simply by providing a mesh stiff enough to hold the cone shape as shown in the drawing.

Figure 6:
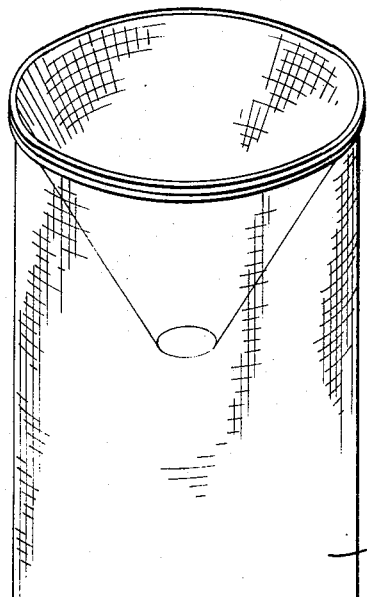
FIG. 6 shows schematically another version of the present invention in which one end of the structure is constructed from flat mesh material so that my invention may be more conveniently employed as a live box.

In FIG. 6 it may be seen that cone 10 can be eliminated in favor of a simple flat ended cylinder 39 so that the structure of my invention will serve equally well as a live box. In this case the flat end 38 could be constructed in a manner similar to that of the cone by fastening an additional ring with plastic or metal wire mesh woven thereon but stretched flat across the bottom of the live box.

Figure 7:
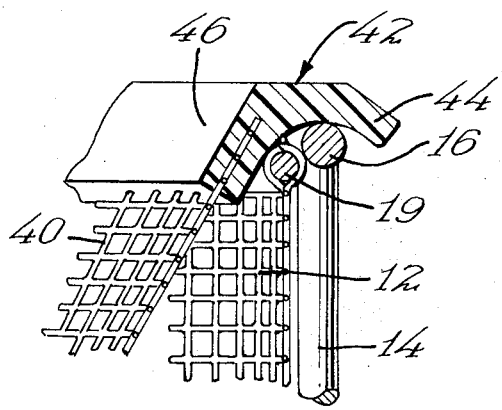
FIG. 7 is a detail sectional view showing how the removable cone may be constructed from plastic molded directly into a rim engaging member.
Figure 8:
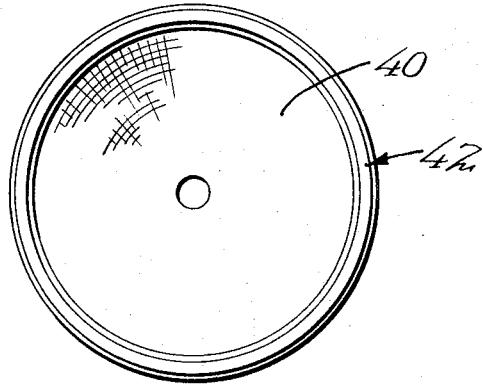
FIG. 8 is a top view of the fish trap as it would appear with the plastic molded conical portion.

In FIG. 7 another embodiment of the present invention is shown. In FIG. 7 the plastic mesh 12 is woven on the support ring 19 which is secured to end ring 16 as discussed earlier. However, the cone portion comprises a plastic mesh material 40 which is molded directly into a circumferential plastic member 42. Plastic member 42 is shaped to fit over the top edges of ring 16 with a portion 44 slanted downward to fit around the outside of the cylindrical structure. Another slanted portion 46 is molded inwardly at an angle and contains molded therein the plastic mesh 40. The apparatus of FIG. 7, viewed from the top of the cylindrical structure, would appear as shown in FIG. 8. In this embodiment it is contemplated that the rim 42 and the cone mesh material 40 would all be molded together in a single operation. This structure would provide the maximum in long life characteristics and the minimum in weight. With the plastic cone section 40 molded into rim 42 it is clear that there would be no protruding edges which would damage the fish. Also the low heat conductivity of plastic together with the fast emptying removable cone prevents freezing of the fish to the trap in winter which can happen in only a few seconds with metal traps.

It is evident that the supporting frame structure could be varied widely without departing from the spirit and scope of the invention. Likewise the particular method of fastening the plastic mesh or the particular configuration of the plastic rim portion could be varied within the concept of the invention and therefore the following claims are presented to cover only the novel concept involved in the instant invention so that the invention will not be limited to the specific structural apparatus shown.

I claim:

1. A fish trap comprising in combination:
   a generally cylindrical framework including spaced end rings mounted on a plurality of longitudinal rods,
   a plastic mesh formed in a generally cylindrical shape and having on each end thereof support rings, said support rings fastened to said end rings,
   a removable conical shaped entrance member closing at least one of the ends of the cylindrical mesh structure and formed from a mesh material with a small hole at the apex of the cone shaped member to permit fish to enter,
   means closing the other end of the cylindrical mesh structure,
   said conical entrance member being pivoted at its edge by a rod connected thereto an to one of the longitudinal rods and further secured by spring loaded hooks connected to at least one of the other longitudinal rods.

2. The structure of claim 1 and in which said conical entrance is made of plastic mesh which is sufficiently stiff to hold its conical shape.

3. The apparatus of claim 1 in which said entrance member mesh is molded into a ring shaped rim adapted to engage one of said end rings.

4. The apparatus of claim 1 in which said entrance member mesh is molded integrally with a ring shaped rim having a groove adapted to accept one of said end rings.

5. The apparatus of claim 4 in which said other end closing means comprises a generally flat mesh closing the cylindrical mesh structure to form a live box.

* * * * *